United States Patent [19]

Berneke

[11] 4,332,663

[45] Jun. 1, 1982

[54] DEHUMIDIFYING DEVICE

[75] Inventor: Erik S. Berneke, Copenhagen, Denmark

[73] Assignee: V. Kann Rasmussen Holding A/S, Denmark

[21] Appl. No.: 179,755

[22] Filed: Aug. 20, 1980

[30] Foreign Application Priority Data

Sep. 17, 1979 [DK] Denmark ................. 3873/79

[51] Int. Cl.³ .................. C25B 9/00; C25B 1/04
[52] U.S. Cl. .................. 204/277; 204/278; 204/129; 204/157.1 R; 136/243
[58] Field of Search ........ 204/129, 157.1 H, 157.1 R, 204/257–258, 263, 266, 275, 278, 277; 136/243

[56] References Cited

U.S. PATENT DOCUMENTS

| | | |
|---|---|---|
| 1,913,703 | 6/1933 | D'Adrian . |
| 4,042,758 | 8/1977 | Weinstein et al. ............ 204/129 |
| 4,090,933 | 5/1978 | Nozik .................. 204/129 |
| 4,144,147 | 3/1979 | Jarrett et al. ............ 204/129 |
| 4,211,620 | 7/1980 | Fowler .................. 204/129 |

FOREIGN PATENT DOCUMENTS

| | | |
|---|---|---|
| 1680600 | 12/1953 | Fed. Rep. of Germany . |
| 2037288 | 9/1976 | Fed. Rep. of Germany . |
| 2808388 | 10/1977 | Fed. Rep. of Germany . |
| 7805931 | 7/1978 | Fed. Rep. of Germany . |

OTHER PUBLICATIONS

Maruska, H. P. and Ghosh, A. K. *Photo Catalytic Decomposition of Water at Semiconductor Electrodes*, Solar Energy, vol. 20, pp. 443–458, (1978).

*Primary Examiner*—R. L. Andrews
*Attorney, Agent, or Firm*—Lane, Aitken, Kice & Kananen

[57] ABSTRACT

For the dehumidification of a cavity preferably the intermediary space (3) between the glass sheets (1, 2) of a window, the dehumidifying device comprises a cell (5, 6, 7) shaped as a cartridge to be inserted in an opening in one of the glass sheets and so arranged as to absorb and by electrolysis to dissociate the water molecules from said cavity (3) by application of external energy. (FIG. 1).

26 Claims, 2 Drawing Figures

DEHUMIDIFYING DEVICE

BACKGROUND OF THE INVENTION

The invention relates to a dehumidifying device for the dehumidification of a cavity, preferably the space between the glass sheets of a window.

For the dehumidification of a cavity, e.g. a room it is known to let the air to said room circulate through a hygroscopic agent, e.g. silica gel. Likewise, it is known that such a hygroscopic agent will gradually become water saturated and will have to be replaced or regenerated.

This is not a problem when dealing with dehumidication of rather large rooms such as a laboratory or part thereof. However, in dealing with an inaccessible cavity or a cavity where at least one of the dimensions is very limited, e.g. the space between the two glass sheets of a double glazing, it can be very difficult or impossible to perform replacement or regeneration of the moisture absorbing agent.

Furthermore, it is known that numerous technical solutions have for many years been proposed or used for keeping the intermediary space in a double glazing free from humidity. For various reasons, these different solutions work most frequently unsatisfactorily.

An important reason is that very often use is made of a hermetic seal designed for remaining tight during the whole lifetime of the window.

This seal cannot be repaired and even a microscopic puncture will spoil the properties of the window. This makes heavy demands on performing the sealing and the insulating power of the double glazing is greatly impaired along the seal.

Another reason is that the manufacturing itself of such windows presupposes a moisture-free atmosphere in the production hall or, at least, that it is dry air which is retained between the two glass sheets at the moment they are hermetically joined together which makes the manufacturing process difficult.

A third reason is to be found in ageing phenomena occurring in said agents, whereby the intended sealing often is only short-lived and from the moment where a leakage has occurred in the double glazing unit the penetrating moisture will result in the well-known phenomena: misting, accumulation of condensed water in the lower part of the window, etc.

SUMMARY OF THE INVENTION

It is an object of the present invention to remedy the stated disadvantages and in view thereof a dehumidifying device according to the invention is characterised in that it comprises a cell so arranged as to dissociate the water molecules from said space by application of external energy.

The advantage of such a design is that the means used to keep the two glass sheets together need no longer be arranged so as to keep both dust and moisture away and it is sufficient to let said means be efficient as dust barrier. The cell can be made to work immediately, i.e. already when assembling the glazing unit and even if a leakage should occur in the unit the cell will effectively prevent misting and thus extend the lifetime of the unit. The water is dissociated by electrolysis and oxygen and hydrogen will be drained off to the atmosphere, whereby the electrolyte is concentrated and its hygroscopic effect is maintained.

For a better understanding of the mode of operation of such a cell reference is made to an article: "Photocatalytic Decomposition of Water at Semiconductor Electrodes" by H. P. Maruska and A. K. Ghosh in Solar Energy, Vol. 20, page 443 to 458, Pergamon Press, 1978.

A particular advantage of the dehumidifying device according to the invention is that its simple design allows it to be placed in already existing windows or in windows manufactured in the usual way, e.g. by mounting it on one of the sheets after having simply made a hole adapted to the cell in said sheet. The dehumidifying device necessitates thus no other modification in existing constructions.

BRIEF DESCRIPTION OF THE DRAWINGS

The invention will be further explained hereinafter with reference to the accompanying schematical drawing in which.

DETAILED DESCRIPTION

Figure 1:
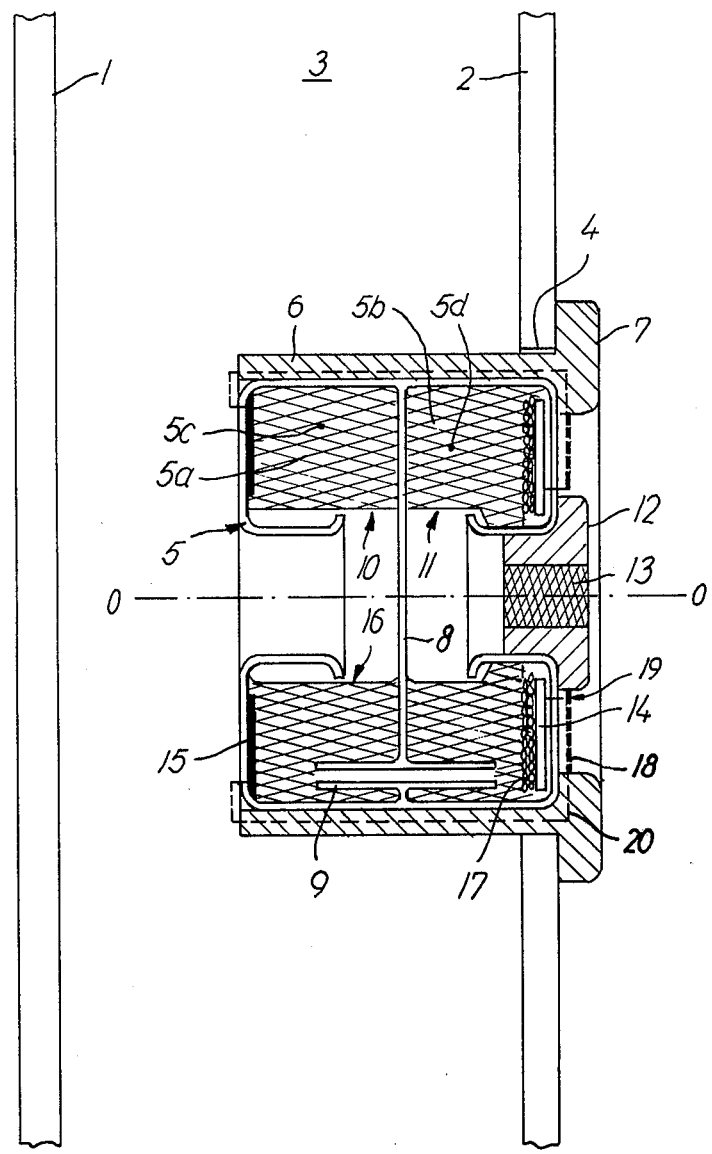
FIG. 1 shows an embodiment of a dehumidifying device according to the invention, especially for use in a tilting window, and FIG. 2 another embodiment of a dehumidifying device according to the invention.

FIG. 1 shows a part of a window, preferably a tilting window, with two essentially parallel glass sheets 1 and 2, separated from one another by an air space 3. The drawing neither shows the window frame nor the pivot hinges or the means for securing the two glass sheets together.

In one of the glass sheets, e.g. the glass sheet 2 which is assumed to be the external glass sheet, provision is made of a preferably circular opening 4 in which the dehumidifying device according to the invention is located.

This dehumidifying device is shaped as a cartridge comprising a glass container 5 surrounded by a plastic jacket 6 which is inserted, e.g. pushed into or firmly glued to the opening 4, its external flange 7 covering the edge of the opening 4.

In the embodiment shown, the glass container 5 is in the form of a cylinder of circular cross-section in relation to axis 0—0, for which reason the plastic jacket 6 is also shaped as a cylinder. By means of a partition 8 essentially perpendicular to the axis 0—0, the glass container 5 is divided up into two compartments 5a and 5b forming vessels which communicate with one another through a glass tube 9 running parallel to the axis 0—0 in the lower part of the partition 8.

As shown in FIG. 1, the side wall of the two compartments which is located nearest the axis 0—0 ends at a certain distance from the partition 8, thus forming an opening or pipe stub 10 which connects one compartment 5a with the air space 3 between the glass sheets 1 and 2, and an opening or pipe stub 11 which connects the other compartment 5b with the atmosphere through an interchangeable filter plug 12 of, e.g., plastic material fitted with a dust filter 13 and inserted in the glass container.

An electrode 14 is provided on the inside of the end wall of the container 5 facing the atmosphere and a second electrode 15 is provided on the inside of the opposite end wall of the container. The two compartments 5a and 5b of the container 5 contain granulated material as shown by references 5c and 5d. Said granulated material is saturated with a hygroscopic electrolyte and reference 16 designates the electrolyte meniscus in one compartment 5a. The electrolyte may, e.g., be concentrated sulphuric acid $H_2SO_4$.

By conveniently dimensioning the glass container 5, the pipe stubs 10 and 11, by suitably locating and dimensioning the glass tube 9 and by choosing a convenient quantity of electrolyte, the window and with it the dehumidifying device may be placed in any position, without liquid leaking out from the container. The purpose of the granulated material is to prevent splashes due to sudden changes in the position of the window or blow-off due to sudden variations of pressure in the air space 3 between the glass sheets 1 and 2.

The inside of the anode 14 is provided with a layer 17 of capillary material which by capillarity absorbs the electrolyte and distributes it over the parts of the electrode which are not immersed in the electrolyte.

As previously mentioned, the dehumidifying device functions by electrolysis of water. Aqueous vapor which is present in the space 3 or originates from outside air diffuses slowly toward the electrolyte and is absorbed therein. When the window cools down, a low pressure appears in the intermediary space 3 and air from outside is drawn in through the filter plug which retains any dust particle from said air. Air is drawn in through the communicating compartments which then work as a trap, whereby the air is dried by passing through the hygroscopic agent. This reduces the moisture of the air which penetrates inside the window, while the water content of the electrolyte increases correspondingly.

When the window is heated either from inside the room or due to exposition to sunlight the pressure in the intermediary space 3 increases, whereby air is expelled throught the dehumidifying device and any water present in said air is absorbed by the electrolyte and dissociated.

For dissociation of the quantity of water present in the electrolyte, electrolysis may be performed. This reaction necessitates that a potential of at least 1.23 V be applied between the two electrodes and in order to obtain a current of fairly convenient magnitude, potentials of 1.6 to 1.8 V will be necessary. It is possible to reduce the necessary potential, which, e.g., can be obtained by means of a battery, by using an anode of, e.g., $TiO_2$, which subjected to illumination produces oxygen, and a cathode of, e.g., Pt which produces hydrogen.

Another possibility of avoiding the need of bias is to use an anode of $SrTiO_3$ which allows photoelectrolysis without bias.

A further possibility of producing the potential for the dissociation phenomenon is based on the use of an external photocell as shown by reference 18, said photocell being connected to the electrodes 14 and 15 via connections 19 and 20.

It should be noted here that in certain circumstances where the intensity of illumination on said photocell would reach an insufficient level, e.g. due to poor illumination or to particular climatic conditions, the energy gained from such a photocell of relatively limited size may be too low. In such case, it is advantageous to use the whole surface or at least part of the whole surface of the outer glass sheet 2 as a support for the photocell layer, said layer (not shown) being then via conductors (not shown) printed on the glass sheet connected with the respective electrodes of the electrolysis cell in the cartridge.

Figure 2:
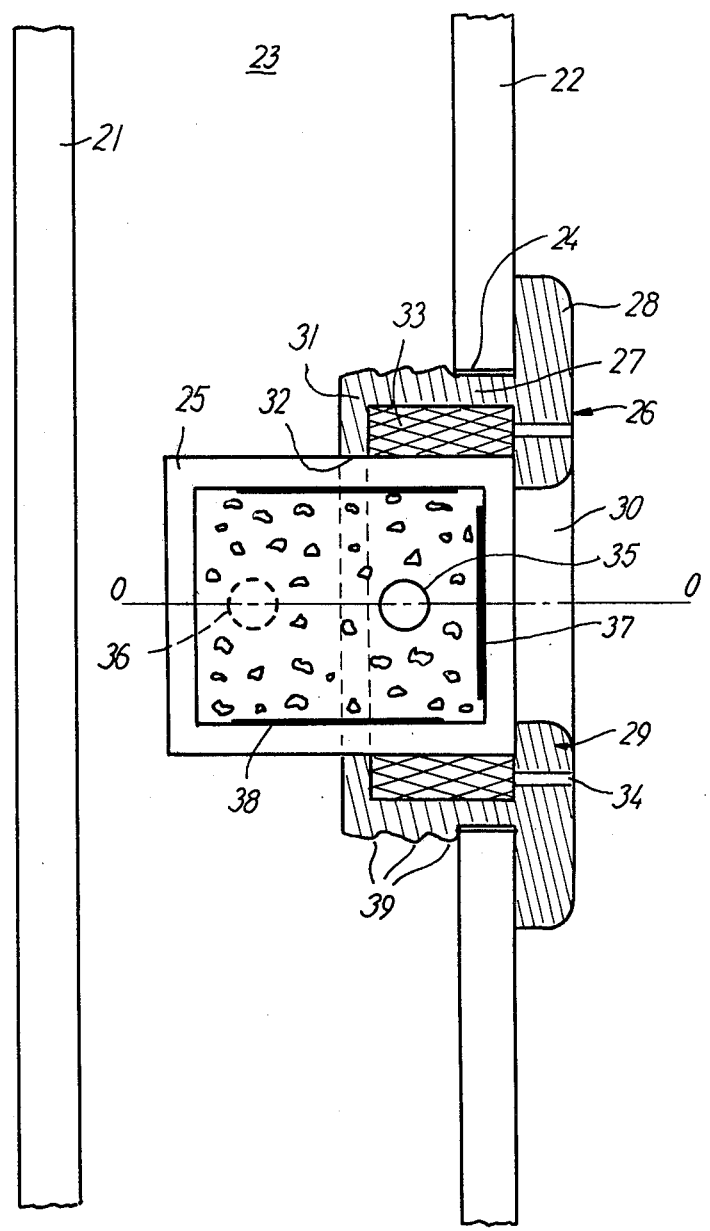

FIG. 2 shows another embodiment of a dehumidifying device according to the invention. In analogy with FIG. 1, neither the window frame nor the hinges or the means for securing the two glass sheets together are shown in FIG. 2.

In one glass sheet, e.g. glass sheet 22, which is assumed to be the external glass sheet, a preferably circular opening 24 has been made in which the dehumidifying cartridge is inserted.

This dehumidifying device comprises a glass container 25 which e.g. is shaped as a circular cylinder around the axis 0—0. This container is maintained in the opening 24 in the glass sheet 22 by means of a sleeve 26 of plastic or elastomer, shaped with a cylindrical part 27 to be inserted in the opening 24 and with an external annular flange 28 to be located against the outer face of the glass sheet 22 around the opening and with an internal annular flange 29 surrounding the central opening 30 of the sleeve and forming a supporting edge for the glass container 25.

At the innermost end of the sleeve 26, the cylindrical part 27 is shaped with a flange 31 which extends radially inwards and surrounds a central opening 32 for the glass container. As shown in FIG. 2, an annular space is provided between the cylindrical side wall of the container 25 and the cylindrical part 27 of the sleeve. Prior to inserting the container in its sleeve said annular space is filled with dust filtering material as shown at 33.

Holes 34 in the internal flange 29 of the sleeve establish connection between the filter space and the atmosphere.

In the cylindrical wall of the container 25 there is at least one hole 35 through which the inside of the container communicates with the annular filter space 33, and at least one hole 36 through which the inside of the container communicates with the intermediate space 23 between the glass sheets 21 and 22.

The container 25 is provided with an electrode 37 on or near the end wall facing the opening 30 in the sleeve and a second electrode 38, e.g., on the cylindrical side wall. The container contains electrolyte in the form of granulated material impregnated with acid, e.g. $H_2SO_4$, or of a gel containing a convenient quantity of acid. The electrode 37 receives sunlight directly. If said electrode is made of, e.g., $SrTiO_3$ or other suitable material having similar semi-conductor properties or combination of such materials, the quantity of water present in the electrolyte dissociates into oxygen and hydrogen.

The outer surface of the cylindrical part 27 of the sleeve is shaped with annular ribs 39 ensuring fixation of the sleeve in the opening 24, both during and after insertion of the sleeve. It has to be noted that the sleeve should be shaped and dimensioned in relation to the glass sheet and to the container so that there is tight fitting at all the places where the sleeve is in contact with the glass or the container.

It should be noted that in the above it is assumed that the container 5 (FIG. 1) or 25 (FIG. 2) is made of glass. However, it may also be made of other material, e.g., plastic, provided that said material lets light pass through to the anode 37 or that the anode 37 is located on the outside of the container, directly accessible to sunlight.

It will be understood that the dehumidifying cartridge as shown in FIG. 2 may also be combined with a photocell layer on the container 25 itself or on at least a part of the surface of the outer glass sheet 22 in the same way as previously explained in relation to the embodiment according to FIG. 1.

What is claimed is:

1. A dehumidification device for dehumidifying the enclosed interior cavity defined between the glass panes of a multiple glazed window, said dehumidification device comprising:
a dehumidification cell mounted in a pane of a multiple glazed window and having a first part in communication with the interior cavity defined between the panes, a second part in communication with the surrounding atmosphere, and a passageway means communicating between said first and second parts to permit air flow therethrough;
a moisture absorbing electrolyte means contained within said cell for absorbing moisture from air passing from the cavity to the surrounding atmosphere and from air passing from the surrounding atmosphere into the cavity;
spaced electrode means within said dehumidification cell and in contact with said moisture absorbing electrolyte means; and
means for supplying energy connected to said spaced electrode means for producing an electrical potential therebetween to effect electrolytic dissociation of the absorbed moisture.

2. The apparatus claimed in claim 1 wherein said dehumidification cell comprises:
a container having opening opposite ends connected by said passageway means, said container insertable within a container-receiving aperture formed in one of the panes to expose one end of said container to the cavity defined between the panes of glass and expose the other end thereof to the surrounding atmosphere.

3. The apparatus claimed in claim 2 wherein said electrode means comprises first and second spaced electrodes with one of said first and second electrodes fabricated from a radiation-responsive material that develops an electrical potential relative to the other of said first and second electrodes in said cell in response to radiation incident thereon.

4. The apparatus claimed in claim 3 wherein said one electrode is fabricated from $TiO_2$.

5. The apparatus claimed in claims 4 wherein the other of said first and second electrodes is fabricated from Pt.

6. The apparatus claimed in claim 3 wherein said one electrode is fabricated from $SrTiO_2$.

7. The apparatus claimed in claim 2 further comprising:
filter means positioned in said passageway means for filtering any air flow therethrough of particulate matter.

8. The apparatus claimed in claim 2 wherein said container is defined by a hollow cylindrical body containing said moisture absorbing electrolyte, said first and second electrodes located within said body and in contact with said electrolyte, said body having a first opening at one end and a second opening the other end.

9. The apparatus claimed in claim 8 wherein said container further comprises:
first and second hollow toroidal chambers containing said electrolyte and separated by a common partition, one of said toroidal chambers exposed to said one side and the other of said toroidal chambers exposed to said other side, said partition having at least one opening formed therein to define said passageway means.

10. The apparatus claimed in claim 9 further comprising filter means in said passageway means to filter any air flow therethrough of particulate material.

11. The apparatus claimed in claim 2 wherein said electrode means comprises first and second spaced electrodes and said means for supplying energy comprises a battery connected to said first and second electrode to apply an electrode potential therebetween.

12. The apparatus claimed in claim 2 wherein said electrode means comprises first and second spaced electrodes and said means for supplying energy comprises a radiation-responsive solar cell connected to said first and second electrodes to apply an electrical potential across said electrodes in response to incident radiation thereon.

13. A dehumidification device for dehumidifying the enclosed interior cavity defined between the glass panes of a multiple glazed window, said dehumidification device comprising:
a dehumidification cell mounted in the pane of a multiple glazed window and in communication with the interior cavity defined between the panes;
a moisture absorbing electrolyte means contained within said dehumidification cell and exposed to the cavity for absorbing moisture therefrom;
spaced electrode means within said dehumidification cell and in contact with said moisture absorbing electrolyte means; and
means for supplying energy connected to said spaced electrode means for producing an electrical potential therebetween to effect electrolytic dissociation of the absorbed moisture.

14. The apparatus claimed in claims 13 or 1 wherein said spaced electrode means comprises;
first and second electrodes spaced from one another in said moisture absorbing electrolyte, said means for supplying energy connected to and applying the electrical potential to said first and second electrodes.

15. The apparatus claimed in claim 14 wherein said means for supplying energy comprises:
a battery connected to said first and second electrode means.

16. The apparatus claimed in claim 14 wherein said means for supplying energy comprises:
a radiation-responsive cell that generates an electrical potential in response to radiation incident thereon, said radiation-responsive cell connected to said first and second electrodes.

17. The apparatus claimed in claim 14 wherein one of said first and second electrodes is fabricated from a radiation responsive material that develops an electrical potential relative the other of said first and second electrodes in said cell in response to radiation incident thereon.

18. The apparatus claimed in claim 17 wherein said radiation responsive material is a semiconductor material.

19. The apparatus claimed in claim 18 wherein said radiation responsive material is $TiO_2$.

20. The apparatus claimed in claim 19 wherein said other of said electrode means is fabricated from Pt.

21. The apparatus claimed in claim 18 wherein said radiation responsive material is $SrTiO_2$.

22. A dehumidifying device for dehumidification of the cavity defined between the glass panes of a multiple pane window, said device comprising;

a water molecule dissociation-cell having a water molecule absorbing electrolyte therein and spaced electrodes in contact with said water molecule absorbing electrolyte;

means for supporting said water molecule dissociation cell in one of said glass panes, a first part of said water molecule dissociation cell in communication with the interior cavity defined between the panes, a second part in communication with the surrounding atmosphere, and a passageway means communicating between said first and second parts to permit air flow therethrough, said water molecule absorbing electrolyte effective to absorb water molecules from the air flow therethrough; and means connected to said spaced electrodes for applying an electrical potential therebetween to effect dissociation of the absorbed water molecules.

23. The dehumidification device claimed in claim 22 wherein said cell comprises:

a cylindrical container having open opposite ends, one end in communication with said cavity and the other end in communication with the surrounding atmosphere, and a passageway between the opposite ends to permit air flow therethrough.

24. The dehumidification device claimed in claim 23 further comprising:

a resilient sleeve fabricated from a material selected from the group consisting of plastic or elastomer inserted in an appropriately sized sleeve-receiving aperture formed in the pane of the multiple glazed windows, said sleeve having a central opening therein to receive said cylindrical container to hermetically maintain said container in communication with said cavity and the surrounding atmosphere.

25. The dehumidifying device claimed in claim 23 further comprising:

dust filter means connected to and positioned in one of the ends of said cylindrical container to effect dust filtration of air flow therein.

26. The dehumidifying device claimed in claim 22 wherein:

said moisture absorbing electrolyte means is made from a material selected from the group consisting of inert granulated material saturated with an electrolyte or an electrolyte-containing moisture absorbing gel.

* * * * *

UNITED STATES PATENT AND TRADEMARK OFFICE
CERTIFICATE OF CORRECTION

PATENT NO. : 4,332,663
DATED : June 1, 1982
INVENTOR(S) : Erik S. Berneke

It is certified that error appears in the above—identified patent and that said Letters Patent is hereby corrected as shown below:

Column 5, Claim 5, should read like claim 6 as follows:

-- 5. The apparatus claimed in claim 3 wherein said one electrode is fabricated from $S_rT_iO_2$. --

Column 5, Claim 6, should be dependent on either of claims 4 or 5 and should read like printed claim 5 as follows:

-- 6. The apparatus claimed in claims 4 or 5 wherein the other of said first and second electrodes is fabricated from Pt. --

Signed and Sealed this

Twenty-fourth Day of May 1983

[SEAL]

Attest:

DONALD J. QUIGG

Attesting Officer

Acting Commissioner of Patents and Trademarks